US010694202B2

(12) United States Patent
Zhang et al.

(10) Patent No.: US 10,694,202 B2
(45) Date of Patent: Jun. 23, 2020

(54) INDICATION OF BILATERAL FILTER USAGE IN VIDEO CODING

(71) Applicant: QUALCOMM Incorporated, San Diego, CA (US)

(72) Inventors: Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/828,280

(22) Filed: Nov. 30, 2017

(65) Prior Publication Data
US 2018/0160134 A1    Jun. 7, 2018

Related U.S. Application Data

(60) Provisional application No. 62/429,052, filed on Dec. 1, 2016.

(51) Int. Cl.
| H04N 19/102 | (2014.01) |
| H04N 19/103 | (2014.01) |
| H04N 19/10 | (2014.01) |
| H04N 19/50 | (2014.01) |
| H04N 19/44 | (2014.01) |
| H04N 19/61 | (2014.01) |
| H04N 19/80 | (2014.01) |
| H04N 19/70 | (2014.01) |
| H04N 19/117 | (2014.01) |

(Continued)

(52) U.S. Cl.
CPC ........... *H04N 19/44* (2014.11); *H04N 19/117* (2014.11); *H04N 19/157* (2014.11); *H04N 19/176* (2014.11); *H04N 19/61* (2014.11); *H04N 19/70* (2014.11); *H04N 19/80* (2014.11); *H04N 19/86* (2014.11)

(58) Field of Classification Search
CPC ...... H04N 19/44; H04N 19/176; H04N 19/86; H04N 19/157; H04N 19/117; H04N 19/70; H04N 19/80; H04N 19/61
See application file for complete search history.

(56) References Cited

U.S. PATENT DOCUMENTS

| 6,983,017 B2 * | 1/2006 | Chen | H04N 19/159 375/240.12 |
| 7,643,560 B2 * | 1/2010 | Hong | H04N 21/242 375/240.25 |

(Continued)

FOREIGN PATENT DOCUMENTS

WO    WO-2012167712 A1    12/2012

OTHER PUBLICATIONS

ITU-T H.265, (Series H: Audiovisual and Multimedia Systems Infrastructure of audiovisual services—Coding of moving video—High Efficiency video coding), Apr. 2015 (Year: 2015).*

(Continued)

*Primary Examiner* — Philip P. Dang
(74) *Attorney, Agent, or Firm* — John Rickenbrode

(57) ABSTRACT

Embodiments include use of a bilateral filter applied to reconstructed blocks as an in-loop filter by both the encoder and decoder. In particular, embodiments include systems and methods of explicitly and implicitly signaling for which blocks to apply bilateral filtering.

16 Claims, 6 Drawing Sheets

(51) Int. Cl.
    *H04N 19/157*     (2014.01)
    *H04N 19/86*     (2014.01)
    *H04N 19/176*     (2014.01)

(56) References Cited

U.S. PATENT DOCUMENTS

| | | | | |
|---|---|---|---|---|
| 7,932,843 B2* | 4/2011 | Demircin | H03M 7/4006 | 341/107 |
| 8,045,615 B2* | 10/2011 | Liang | H04N 19/61 | 375/240.03 |
| 8,189,943 B2* | 5/2012 | Yea | G06T 3/40 | 382/257 |
| 8,270,752 B2* | 9/2012 | Yea | G06T 5/002 | 348/14.13 |
| 8,320,453 B2* | 11/2012 | Jeon | H04N 19/70 | 341/107 |
| 8,374,456 B2* | 2/2013 | Vetro | G06T 3/40 | 382/260 |
| 8,395,642 B2* | 3/2013 | Yea | G06T 3/0093 | 345/647 |
| 8,396,134 B2* | 3/2013 | Hong | H04N 19/105 | 375/240.12 |
| 8,542,751 B2* | 9/2013 | Ahuja | H04N 19/117 | 375/240.03 |
| 8,630,507 B2* | 1/2014 | De Haan | G06T 5/20 | 358/463 |
| 9,001,890 B2* | 4/2015 | Song | H04N 19/147 | 375/240.12 |
| 9,088,785 B2* | 7/2015 | Srinivasan | H04N 19/105 | |
| 9,118,932 B2* | 8/2015 | Avadhanam | H04N 19/176 | |
| 9,172,956 B2* | 10/2015 | Lim | H04N 19/51 | |
| 9,191,672 B2* | 11/2015 | Oh | H04N 19/13 | |
| 9,219,914 B2* | 12/2015 | Park | H04N 19/176 | |
| 9,307,264 B2* | 4/2016 | Tsukuba | H04N 19/44 | |
| 9,386,319 B2* | 7/2016 | Zhu | G06F 3/1454 | |
| 9,420,293 B2* | 8/2016 | Song | H04N 19/176 | |
| 9,451,270 B2* | 9/2016 | Song | H04N 19/176 | |
| 9,479,786 B2* | 10/2016 | Lu | H04N 19/176 | |
| 9,491,461 B2* | 11/2016 | Chen | H04N 19/52 | |
| 9,503,725 B2* | 11/2016 | Song | H04N 19/159 | |
| 9,525,876 B2* | 12/2016 | Ikai | H04N 19/14 | |
| 9,538,205 B2* | 1/2017 | Ikai | H04N 19/91 | |
| 9,578,331 B2* | 2/2017 | Ye | H04N 19/197 | |
| 9,681,152 B2* | 6/2017 | Wang | H04N 19/159 | |
| 9,712,823 B2* | 7/2017 | Min | H04N 19/50 | |
| 9,762,903 B2* | 9/2017 | Chen | H04N 19/30 | |
| 9,813,737 B2* | 11/2017 | Wang | H04N 19/61 | |
| 9,900,611 B2* | 2/2018 | Itani | H04N 19/513 | |
| 10,015,515 B2* | 7/2018 | Guo | H04N 19/52 | |
| 10,080,024 B2* | 9/2018 | Xu | H04N 19/105 | |
| 10,244,256 B2* | 3/2019 | Ikai | H04N 19/597 | |
| 10,306,235 B2* | 5/2019 | Ikai | H04N 19/597 | |
| 2006/0126725 A1* | 6/2006 | Zeng | H04N 17/004 | 375/240.03 |
| 2007/0025448 A1* | 2/2007 | Cha | H04N 19/159 | 375/240.24 |
| 2007/0098078 A1* | 5/2007 | Kim | H04N 19/119 | 375/240.24 |
| 2008/0267297 A1* | 10/2008 | Sampedro | H04N 19/176 | 375/240.24 |
| 2009/0003446 A1* | 1/2009 | Wu | H04N 19/176 | 375/240.16 |
| 2009/0028249 A1* | 1/2009 | Gomila | H04N 19/597 | 375/240.29 |
| 2010/0027686 A1* | 2/2010 | Zuo | G06T 9/00 | 375/240.29 |
| 2010/0239002 A1* | 9/2010 | Park | H04N 19/176 | 375/240.12 |
| 2011/0110427 A1* | 5/2011 | Teng | H04N 19/176 | 375/240.16 |
| 2011/0134996 A1* | 6/2011 | Nandy | H04N 19/13 | 375/240.02 |
| 2011/0142134 A1* | 6/2011 | Wahadaniah | H04N 19/176 | 375/240.16 |
| 2011/0188768 A1* | 8/2011 | Pateux | H04N 19/105 | 382/238 |
| 2012/0020580 A1* | 1/2012 | Sasai | H04N 19/176 | 382/233 |
| 2012/0163452 A1* | 6/2012 | Horowitz | H04N 19/137 | 375/240.12 |
| 2012/0163460 A1* | 6/2012 | Chien | H04N 19/523 | 375/240.16 |
| 2012/0182388 A1* | 7/2012 | Lim | H04N 19/597 | 348/43 |
| 2013/0016771 A1* | 1/2013 | Misra | H04N 19/176 | 375/240.03 |
| 2013/0016786 A1* | 1/2013 | Segall | H04N 19/70 | 375/240.16 |
| 2013/0022119 A1* | 1/2013 | Chien | H04N 19/159 | 375/240.16 |
| 2013/0089151 A1* | 4/2013 | Do | H04N 19/176 | 375/240.18 |
| 2013/0128964 A1* | 5/2013 | Chien | H04N 19/50 | 375/240.12 |
| 2013/0322530 A1* | 12/2013 | Rossato | H04N 19/63 | 375/240.12 |
| 2014/0079135 A1* | 3/2014 | Van der Auwera | H04N 19/70 | 375/240.18 |
| 2014/0192157 A1* | 7/2014 | Chen | H04N 19/597 | 348/44 |
| 2014/0253681 A1* | 9/2014 | Zhang | H04N 19/597 | 348/43 |
| 2014/0254676 A1* | 9/2014 | Jiang | H04N 19/124 | 375/240.12 |
| 2014/0286400 A1* | 9/2014 | Joshi | H04N 19/70 | 375/240.03 |
| 2014/0286413 A1* | 9/2014 | Joshi | H04N 19/70 | 375/240.12 |
| 2014/0286428 A1* | 9/2014 | Lee | H04N 19/137 | 375/240.16 |
| 2014/0341297 A1* | 11/2014 | Chien | H04N 19/13 | 375/240.16 |
| 2014/0376634 A1* | 12/2014 | Guo | H04N 19/52 | 375/240.16 |
| 2015/0003525 A1* | 1/2015 | Sasai | H04N 19/176 | 375/240.12 |
| 2015/0023420 A1* | 1/2015 | Minezawa | H04N 19/86 | 375/240.13 |
| 2015/0063471 A1 | 3/2015 | Zhu et al. | | |
| 2015/0139298 A1* | 5/2015 | Seregin | H04N 19/105 | 375/240.02 |
| 2015/0189276 A1* | 7/2015 | Sugimoto | H04N 19/61 | 375/240.02 |
| 2015/0189329 A1* | 7/2015 | Wada | H04N 19/59 | 382/199 |
| 2015/0195559 A1* | 7/2015 | Chen | H04N 19/11 | 375/240.16 |
| 2015/0195566 A1* | 7/2015 | Hinz | H04N 19/198 | 375/240.13 |
| 2015/0229926 A1* | 8/2015 | Puri | H04N 19/61 | 375/240.02 |
| 2015/0341655 A1* | 11/2015 | Joshi | H04N 19/70 | 375/240.16 |
| 2015/0341660 A1* | 11/2015 | Joshi | H04N 19/583 | 375/240.03 |
| 2015/0341673 A1* | 11/2015 | Joshi | H04N 19/70 | 375/240.12 |
| 2015/0373357 A1* | 12/2015 | Pang | H04N 19/174 | 375/240.12 |
| 2016/0050442 A1* | 2/2016 | Saxena | H04N 19/82 | 375/240.29 |
| 2016/0057427 A1* | 2/2016 | Oh | H04N 19/176 | 375/240.03 |
| 2016/0198188 A1* | 7/2016 | Oh | H04N 19/44 | 375/240.12 |
| 2016/0234492 A1* | 8/2016 | Li | H04N 19/117 | |
| 2016/0321523 A1* | 11/2016 | Sen | G06T 5/002 | |
| 2016/0373745 A1* | 12/2016 | Joshi | H04N 19/119 | |
| 2016/0373785 A1* | 12/2016 | Said | H04N 19/10 | |
| 2017/0134758 A1* | 5/2017 | Rosewarne | H04N 19/86 | |

(56) References Cited

U.S. PATENT DOCUMENTS

| | | | |
|---|---|---|---|
| 2017/0150156 A1* | 5/2017 | Zhang | H04N 19/119 |
| 2018/0048895 A1* | 2/2018 | Jeon | H04N 19/159 |
| 2018/0184131 A1* | 6/2018 | Yoo | H04N 19/159 |
| 2018/0338144 A1* | 11/2018 | Nam | H04N 19/176 |

OTHER PUBLICATIONS

ITU-T H.264, (Series H: Audiovisual and Multimedia Systems Infrastructure of audiovisual services—Coding of moving video—Advanced video coding for generic audiovisual services), Jan. 2012 (Year: 2012).*

Bross et al., (High efficiency video coding (HEVC) text specification draft 6), Feb. 10, 2012 (Year: 2012).*

Chia-Yang Tsai, "Slice Boundary Processing and Picture Layer Raw Byte Sequence Payload", JCTVC-D128, Jan. 20-28, 2011 (Year: 2011).*

Chih-Ming Fu, "Sample Adaptive Offset with Padding at LCU, Slice, and Image Boundaries", JCTVC-F093, Jul. 14-22, 2011 (Year: 2011).*

Chia-Yang Tsai, "AHG4: Non-cross-tiles loop filtering for independent tiles", JCTVC-G194, Nov. 21-30, 2011 (Year: 2011).*

Bross et al., (High efficiency video coding (HEVC) text specification draft 5), Nov. 21-30, 2011 (Year: 2011).*

ITU-T H.265, (Series H: Audiovisual and Multimedia Systems Infrastructure of audiovisual services—Coding of moving video—High Efficiency video coding), 04/ 2015 (Year: 2015).*

Kwon, et al., "Transform size dependent deblocking filter," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, Document: JCTVC-I0244, 12 pages.

Alshina E., et al., "Description of Exploration Experiments on Coding Tools", 4. JVET Meeting; Oct. 15-Oct. 21, 2016; Chengdu; (The Joint Video Exploration Team of ISO/IEC JTC1/SC29/WG11 and ITU-T SG.16 ); No. JVET-D1011 -v3, Dec. 26, 2016 (Dec. 26, 2016), XP030150463, pp. 1-13, URL: http://phenix.int-evry.fr/jvet/ http://phenix.int-evry.fr/jvet/.

International Search Report and Written Opinion—PCT/US2017/064358—ISA/EPO—Feb. 6, 2018.

Strom J., et al., "Bilateral Filter Strength Based on Prediction Mode", 5. JVET Meeting; Jan. 12-Jan. 20, 2017; Geneva; (The Joint Video Exploration Team of ISO/IECJTC1/SC29/WG11 and ITU-T SG.16); No. JVET-E0032, Jan. 3, 2017 (Jan. 3, 2017), XP030150498, pp. 1-3, URL: http://phenix.int-evry.fr/jvet/.

Zhao J., et al., "Non-SCE4: Adaptive up-sampling of base layer picture using Simplified Separable bilateral filters", 13. JCT-VC Meeting; 104. MPEG Meeting; Apr. 18-Apr. 26, 2013; Incheon; (Joint Collaborative Team on Video Coding of ISO/IEC JTC1/SC29/WG11 and ITU-TSG.16); No. JCTVC-M0215, Apr. 9, 2013 (Apr. 9, 2013), XP030114172, pp. 1-7, URL: http://wftp3.itu.int/av-arch/jctvc-site/.

Pu W., et al., "SCE3: Results of Test 3.1 on Switchable Alternative Inter-Layer Filter", 14. JCT-VC Meeting; Jul. 25-Feb. 8, 2013; Vienna; (Joint Collaborative Team on Video Coding of ISO/IEC JTC1/SC29/WG11 and ITU-T SG.16), URL: HTTP://WFTP3.ITU.INT/AV-ARCH/JCTVC-SITE/,No. JCTVC-N0151-v4, Jul. 26, 2013 (Jul. 26, 2013), XP030114623.

Alshina E., et al., "Description of Exploration Experiments on Coding Tools", 5. JVET Meeting; Jan. 12-Jan. 20, 2017; Geneva; (The Joint Video Exploration Team Of ISO/IECJTC1/SC29/WG11 and ITU-T SG.16); No. JVET-E1011, Jan. 20, 2017 (Jan. 20, 2017), XP030150651, pp. 1-8, URL: http://phenix.int-evry.fr/jvet/.

Bross B., et al., "High Efficiency Video Coding (HEVC) Text Specification Draft 10 (for FDIS & Last Call)," 12th Meeting: Geneva, CH, Jan. 14-23, 2013, Joint Collaborative Team on Video Coding (JCT-VC) of ITU-T SG 16 WP 3 and ISO/IEC JTC 1/SC 29WG 11, Document: JCTVC-L1003_v34, Mar. 19, 2013, 310 pages.

Fu C-M., et al., "Sample Adaptive Offset in the HEVC Standard," IEEE Transactions on Circuits and Systems for Video Technology, Dec. 2012, vol. 22, No. 12, pp. 1755-1764.

Karczewicz M., et al., "Improvements on Adaptive Loop Filter," Joint Video Exploration Team (JVET) of ITU-T SG 16 WP 3 and ISO/IEC JTC 1/SC 29/WG 11,Document:JVET-B0060-v2, 2nd Meeting: San Diego, USA, Feb. 20-26, 2016, XP030150068, URL: http://PHENIX.INT-EVRY.FR/JVET/.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-00038, 3rd Meeting: Geneva, CH, May 26-Jun. 1, 2016, 4 pages.

Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

Strom J., et al., "Bilateral Filter After Inverse Transform," Joint Video Exploration Team (JVET) OF ITU-T SG 16 WP 3 and ISO/IEC JTC 1/SC 29/WG 11, Document: JVET-D0069, 4th Meeting: Chengdu, CN, Oct. 15-21, 2016, 5 pages.

Tomasi C., et al., "Bilateral Filtering for Gray and Color Images," in Proceedings of the IEEE International Conference on Computer Vision, 1998.

* cited by examiner

INDICATION OF BILATERAL FILTER USAGE IN VIDEO CODING

CLAIM OF PRIORITY UNDER 35 U.S.C. § 119

The present Application for Patent claims priority to Provisional Application No. 62/429,052 entitled "Indication of Bilateral Filter Usage in Video Coding" filed Dec. 1, 2016 and assigned to the assignee hereof and hereby expressly incorporated by reference herein.

BACKGROUND

Field

This disclosure relates to video coding, e.g., encoding and decoding of compressed video bitstreams.

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized ITU-T H.265, High Efficiency Video Coding (HEVC), standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to filtering, such as the use of bilateral filtering applied to reconstructed blocks as an in-loop filter by both the encoder and decoder. In particular, such filtering can improve overall coding efficiency by reducing artifacts at a particular bit-rate. However, such efficiency requires efficient signaling of when such bilateral filtering is applied. Embodiments include systems and methods of explicitly and implicitly signaling for which blocks to apply bilateral filtering.

One embodiment includes a method of decoding video data. The method includes decoding data from a video bitstream indicating a mode for coding a video block. The method further includes predicting the video block according to the decoded mode to generate a predicted video block of the video block, decoding, from the bitstream, data indicative of a difference between the video block and the predicted video block, and reconstructing samples associated with the video block based on the predicted video block and the difference. The method further includes decoding a flag from the bitstream indicating whether to apply bilateral filtering to the reconstructed video data. The method further includes performing bilateral filtering on the reconstructed samples based on the flag.

Another embodiment includes a method of encoding video data. The method includes encoding data into a video bitstream indicating a mode for coding a video block, predicting the video block according to the mode to generate the predictive block of the video block, encoding, into the bitstream, data indicative of a difference between the video block and the predicted video block, and reconstructing samples associated with the video block based on the predicted video block and the difference. The method further includes encoding a flag into the bitstream indicating whether to apply bilateral filtering to the reconstructed video data and performing bilateral filtering on the reconstructed samples based on the value of the flag.

One embodiment includes an apparatus for decoding video data. The apparatus includes means for decoding data from a video bitstream indicating a mode for coding a video block. The apparatus further includes means for predicting the video block according to the decoded mode to generate a predicted video block of the video block, means for decoding, from the bitstream, data indicative of a difference between the video block and the predicted video block, and means for reconstructing samples associated with the video block based on the predicted video block and the difference. The apparatus further includes means fordecoding a flag from the bitstream indicating whether to apply bilateral filtering to the reconstructed video data. The apparatus further includes means for performing bilateral filtering on the reconstructed samples based on the flag.

Another embodiment includes means for encoding video data. The apparatus includes means for encoding data into a video bitstream indicating a mode for coding a video block, predicting the video block according to the mode to generate the predictive block of the video block, means for encoding, into the bitstream, data indicative of a difference between the video block and the predicted video block, and means for reconstructing samples associated with the video block based on the predicted video block and the difference. The apparatus further includes means for encoding a flag into the bitstream indicating whether to apply bilateral filtering to the reconstructed video data and means for performing bilateral filtering on the reconstructed samples based on the value of the flag.

Another embodiment includes a method of encoding video data. The method includes encoding data into a video bitstream indicating a mode for coding a video block, predicting the video block according to the mode to generate the predictive block of the video block, encoding, into the bitstream, data indicative of a difference between the video block and the predicted video block, and reconstructing samples associated with the video block based on the predicted video block and the difference. The method further includes encoding a flag into the bitstream indicating whether to apply bilateral filtering to the reconstructed video data and performing bilateral filtering on the reconstructed samples based on the value of the flag.

One embodiment includes an apparatus for decoding video data. The apparatus includes a memory configured to store the video data. The apparatus further includes a video processor configured to decode data from a video bitstream indicating a mode for coding a video block, predict the video block according to the decoded mode to generate the predictive block of the video block, decode, from the bitstream, data indicative of a difference between the video block and the predicted video block, reconstruct samples associated with the video block based on the predicted video block and the difference, decode a flag from the bitstream indicating whether to apply a bilateral filtering to the reconstructed video data, and perform bilateral filtering on the reconstructed samples based on the flag.

One embodiment includes an apparatus for encoding video data. The apparatus includes a memory configured to store the video data. The apparatus further includes a video processor configured to video processor configured to encode data into a video bitstream indicating a mode for coding a video block, predict the video block according to the mode to generate the predictive block of the video block, encode, into the bitstream, data indicative of a difference between the video block and the predicted video block, reconstruct samples associated with the video block based on the predicted video block and the difference, encode a flag into the bitstream indicating whether to apply a bilateral filtering to the reconstructed video data and perform bilateral filtering on the reconstructed samples based on the value of the flag.

Yet another embodiment includes a method of decoding video data. The method includes decoding data from a video bitstream indicating a mode for coding a video block. The method further includes predicting the video block according to the decoded mode to generate a predicted video block of the video block, decoding, from the bitstream, data indicative of a difference between the video block and the predicted video block, and reconstructing samples associated with the video block based on the predicted video block and the difference. The method further includes decoding determining whether to apply bilateral filtering to the reconstructed video data based on at least one of a slice type associated with the video block, a motion precision associated with the video block, transform coefficients indicative of the difference between the video block and the predicted video block, the mode for coding the video block, or a deblock filter parameter associated with the block. The method further includes performing bilateral filtering on the reconstructed samples based on the determination.

DETAILED DESCRIPTION

Figure 1:
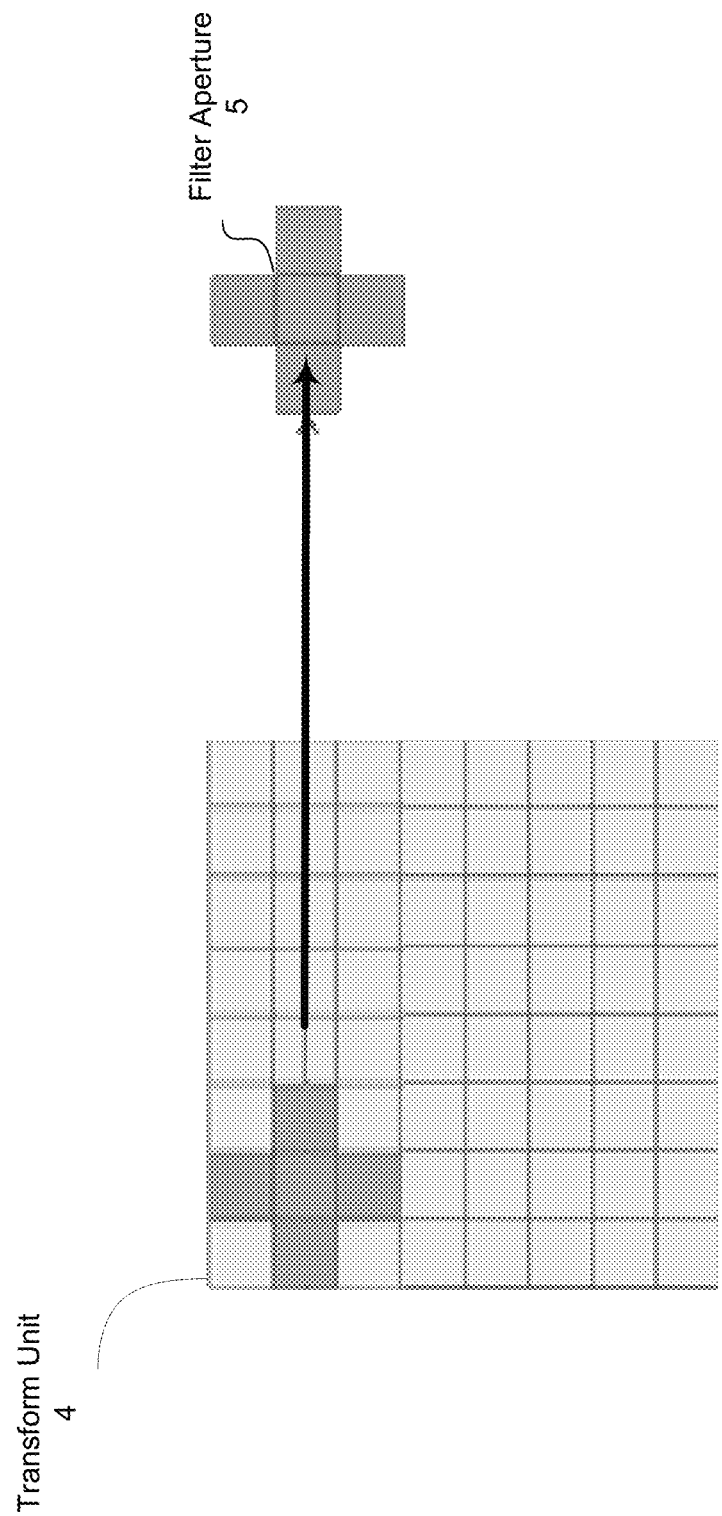
FIG. 1 is a diagram illustrating an example of a transform unit block and the filter aperture for a specific sample.

Video codecs may be defined such that encoders and decoders include in-loop filters that apply a filtering process to all or part of a picture after reconstruction of blocks of the picture. In an in-loop filter, the filtered result is placed in a decoded picture buffer with pictures that may be used as reference pictures for inter-prediction of other blocks (such as in other pictures). By comparison, a post filter is applied to pictures such that the filtered picture is not used for inter-prediction. Because in-loop filters are applied so that the filtered data is used for prediction of other blocks, such filters should be part of the codec specification and applied at both the encoder and decoder. The video encoder determines on which blocks to apply specific in-loop filters based on techniques such as rate-distortion optimization, or certain rules applied to both encoder and decoder.

The HEVC video standard employs two in-loop filters including de-blocking filter (DBF) and Sample Adaptive Offset (SAO) filter. The deblocking filter performs detection of the artifacts at the coded block boundaries and attenuates them by applying a selected filter. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a coding tree unit (CTU). Two SAO types that can satisfy the requirements of low complexity are adopted in HEVC: edge offset (EO) and band offset (BO). For EO, the sample classification is based on comparison between current samples and neighboring samples according to 1-D directional patterns: horizontal, vertical, 135° diagonal, and 45° diagonal. For BO, the sample classification is based on sample values. To reduce side information, multiple CTUs can be merged together (either copying the parameters from above CTU (through setting sao_merge_left_flag equal to 1) or left CTU (through setting sao_merge_up_flag equal to 1) to share SAO parameters.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 3 (JEM 3) available at https://jvet.hhi.fraunhofer.de/svn/svn_HMJEMSoftware/tags/HM-16.6-JEM-3.0/. Algorithm description of Joint Exploration Test Model 3 (JEM3) with a document number referred to as JVET-C 1001 available at http://phenix.it-sudparis.eu/jvet/doc_end_user/current_document.php?id=2714.

In addition to the modified DB and HEVC SAO methods, JEM has included another filtering method, called Geometry transformation-based Adaptive Loop Filtering (GALF). GALF aims improve the coding efficiency of ALF studied in HEVC stage by introducing several new aspects. ALF is aiming to minimize the mean square error between original samples and decoded samples by using Wiener-based adaptive filter. Samples in a picture are classified into multiple categories and the samples in each category are then filtered with their associated adaptive filter. The filter coefficients may be signaled or inherited to optimize the tradeoff between the mean square error and the overhead.

Other types of in-loop filters may be used. Bilateral filtering has been proposed to avoid undesirable over-smoothing for pixels in the edge. Bilateral filtering includes the weighting of neighboring samples to take into account the pixel values themselves to weight more those pixels with similar luminance or chrominance values. A sample located at (i, j), is filtered using its neighboring sample (k, l). The weight ω(i, j, k, l) is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

I(i, j) and I(k, l) are the intensity value of samples (i, j) and (k, l) respectively. $\sigma_d$ is the spatial parameter, and $\sigma_r$, is the range parameter. The filtering process with the filtered sample value denoted by $I_D(i, j)$ could be defined as:

$$I_D(i, j) = \frac{\sum_{k,l} I(k, l) * \omega(i, j, k, l)}{\sum_{k,l} \omega(i, j, k, l)} \quad (2)$$

In some embodiments, the properties (or strength) of the bilateral filter is controlled by these two parameters. Samples located closer to the sample to be filtered, and samples having smaller intensity difference to the sample to be filtered, have larger weights than samples further away and with larger intensity difference. In some embodiments, each reconstructed sample in the transform unit (TU) is filtered using its direct neighboring reconstructed samples only.

In particular, FIG. 1 is a diagram of an example transform unit 4, e.g., an 8×8 transform, illustrating a filter that includes a plus sign shaped filter aperture 5 centered at the sample to be filtered. In one such example, $\sigma_d$ to be set based on the transform unit size (3), and $\sigma_r$ to be set based on the QP used for the current block (4).

$$\sigma_d = 0.92 - \frac{\min(TU\ \text{block width, } TU\ \text{block height})}{40} \quad (3)$$

$$\sigma_r = \max\left(\frac{(QP-17)}{2}, 0.01\right) \quad (4)$$

It is noted that in some embodiments bilateral filtering is only applied to luma blocks with at least one non-zero coefficients. For all chroma blocks and luma blocks with all zero coefficients, in such embodiments, the bilateral filtering method is always disabled. In such embodiments, there is no need for explicit signaling indicating to which blocks bilateral filtering is to be applied.

Existing embodiments of enabling/disabling bilateral filtering may have various limitations that remain to be been addressed. For example, the dependency on checking of all zero coefficients in a TU may be based on the assumption that the reconstruction block (which is identical to prediction block) may have been already filtered. The assumption may be true for inter-coded blocks, but is not generally for intra coded blocks. Further, other embodiments of signaling the enabling and disabling of bilateral filtering may in some cases improve coding efficiency.

In some embodiments, a flag is signaled to enable and/or disable bilateral filtering. For example, such a flag may be signaled in syntax elements of the transform unit, the prediction unit, or the largest coding unit of the block.

In particular, in some embodiments, bilateral filtering is applied in-loop to blocks after a deblock filter has been applied to the blocks. In such embodiments, it may be desirable to explicitly signal for which blocks to apply bilateral filtering.

In some embodiments, such flags may be signaled at different levels for the same block such that a flag associated with a lower level structure overrides the flag associated with a higher level structure (e.g., transform unit level flag overrides flag from the prediction unit or the largest coding unit, or a prediction unit flag overrides a largest coding unit flag, etc.). In other embodiments, the signaled flag may enable or disable bilateral filtering in combination with inferred determinations. For example, a block or slice may override based on inferring whether to apply bilateral filtering according to one or more of embodiments disclosed herein.

In one embodiment, the flag is signaled in a transform coefficient of the block similarly to sign data hiding in HEVC. In one embodiment, the flag is signaled in transform coefficients of the block similarly to sign data hiding in HEVC. For example, the encoder determines whether the flag is to explicitly signaled or "hidden." The decision consists in comparing the number of coefficients between the first and last non-zero coefficients in their scanning order with a predefined threshold. If this number is lower than a predefined threshold, the flag is coded explicitly. Otherwise, the flag is inferred from the parity of the sum of the quantized coefficients, following a predefined convention (for example, even corresponds to "+" and odd to "−").

Alternatively, in some embodiments, enablement/disablement of bilateral filtering may depend (be inferred). According to one such embodiment, determining whether to enable/disable bilateral filtering may be based on slice type. In one example, for I-slices, the bilateral filtering may be always enabled without checking whether there is at least one non-zero coefficient. For P or/and B slices, the enabling/disabling bilateral filtering may be inferred or signaled accordingly to any other embodiment described herein.

In some embodiments, enablement/disablement of bilateral filtering may depend (be inferred) based on motion vector precision. In one example, when the motion vector used for inter-prediction of the block points to an integer position (Full-Pel precision), the block may be filtered even there is no non-zero coefficient. Alternatively, when the motion vector of a block points to a sub-pixel motion position (Sub-Pel precision), the block may be filtered even there is no non-zero coefficient.

In some embodiments, enablement/disablement of bilateral filtering may depend (be inferred) based on how strong the residuals (in pixel domain or transform domain) are. For example, whether to filter may be based on whether a value indicative of the energy of some or all of the transform coefficients of the block exceeds a specified threshold.

In some embodiments, enablement/disablement of bilateral filtering may depend (be inferred) based on, for the top row (a few top rows) and/or left column (a few left columns) of a block, the corresponding deblocking filter parameters. The enablement/disablement of bilateral filtering may depend on parameters that indicate whether the deblocking is to be applied or not, and/or parameters that indicate how strong the deblocking filter is to be. In one example, the above deblock parameter indicated may be applied to other boundary samples of a block, such as right column(s) or below row(s).

In some embodiments, enablement/disablement of bilateral filtering may depend (be inferred) based on, the coding mode, of the block. For example, in one such embodiment, it may depend on whether the mode is PDPC (Position dependent intra prediction combination). In one example, when this or another specific mode is enabled for one block, the bilateral filtering method is disabled.

It is also to be recognized that while certain embodiments are disclosed herein with respect to bilateral filtering as an in-loop filter, other embodiments may include bilateral filtering as a post-filter with signaling or implicit derivation according to any suitable embodiment described above.

Figure 2:
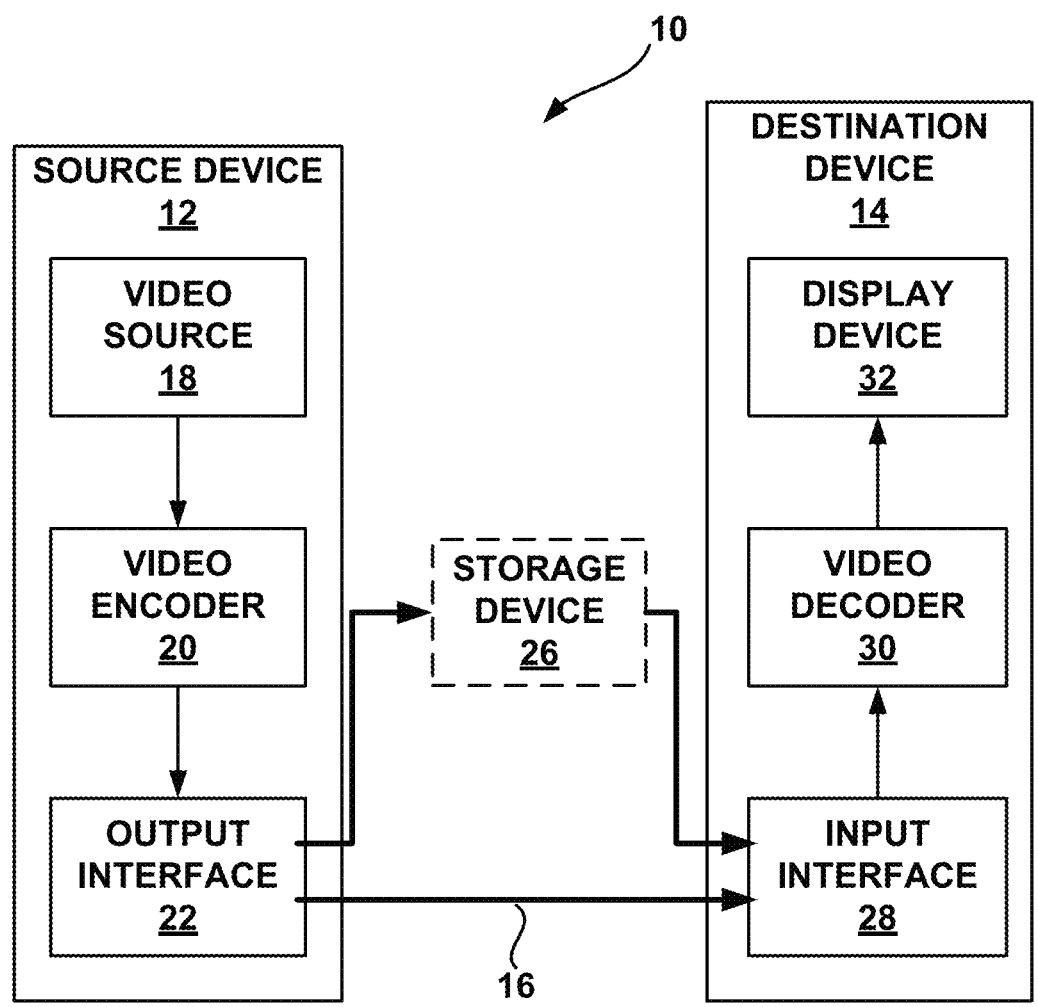
FIG. 2 is a block diagram illustrating an example video encoding and decoding system that may utilize the techniques described in this disclosure.

FIG. 2 is a block diagram illustrating an example video encoding and decoding system 10 that may implement the techniques described in this disclosure. As shown in FIG. 2, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 2, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 2, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the field of video coding, it is common to apply filtering in order to enhance the quality of a decoded video signal. The filter can be applied as a post-filter, where the filtered frame is not used for prediction of future frames, or as an in-loop filter, where the filtered frame may be used to predict future frames.

Figure 3:
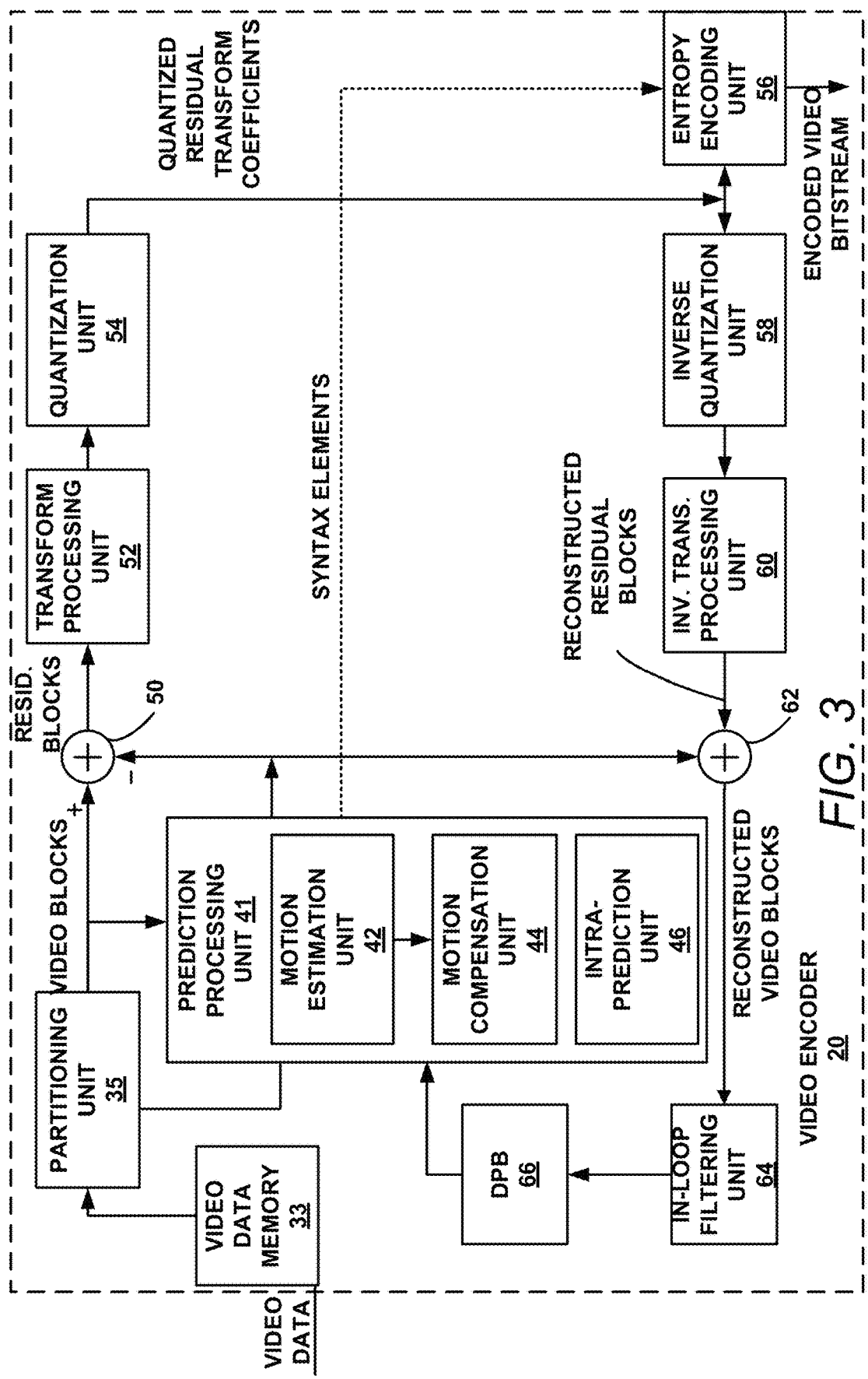
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, in-loop filtering unit 64, and decoded picture buffer (DPB) 66.

As shown in FIG. 3, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-prediction of the current video block relative to one or more neighboring blocks in the same frame or slice as the current block to be coded to provide spatial compression. Motion estimation unit 42 and motion compensation unit 44 within prediction processing unit 41 perform inter-prediction of the current video block relative to one or more reference blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

In-loop filtering unit 64 filters the reconstructed block (e.g., the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 3, video encoder 20 may include filters such as one or more of a deblock filter, a sample adaptive offset (SAO) filter, or another type of loop filter. A deblock filter may, for example, apply deblocking filtering to filter block boundaries to remove blockiness artifacts from reconstructed video. An SAO filter may apply offsets to reconstructed pixel values in order to improve overall coding quality. In some implementations, SAO may be a special case or special mode of ALF filtering. Additional loop filters (in loop or post loop) may also be used. In particular, in-loop filtering unit 64 may include a bilateral filter that is applied as described in this disclosure. In one embodiment, the bilateral filter, if applied, to a block is applied after the deblock filter.

Figure 4:
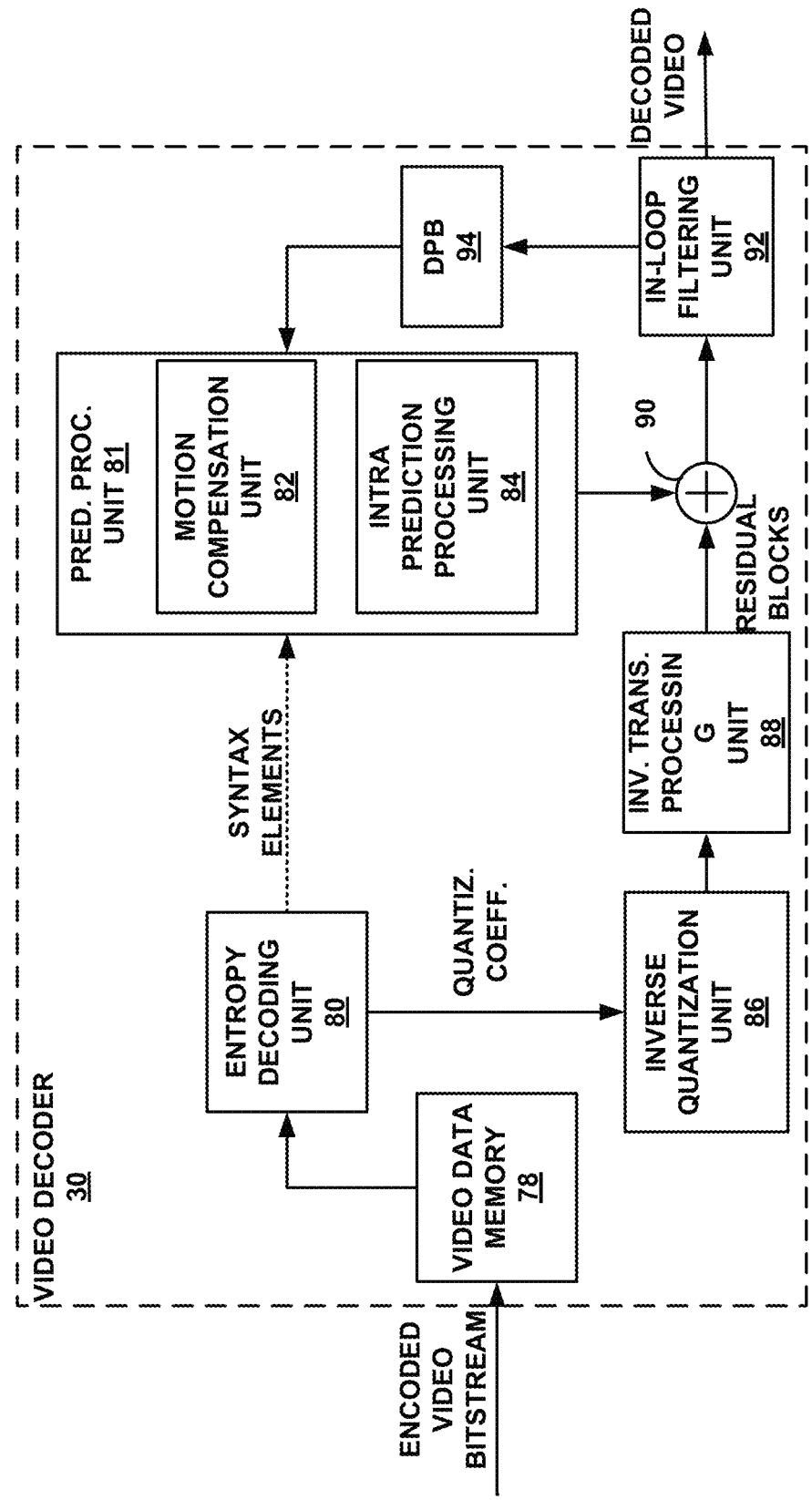
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes video data memory 78, entropy decoding unit 80, prediction processing unit 81, inverse quantization unit 86, inverse transform processing unit 88, summer 90, and decoded picture buffer (DPB) 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82.

Summer 90 represents the component or components that perform this summation operation. In-loop filtering unit 92 filters the reconstructed video block using, for example, one or more of a deblock filter, an SAO filter, or other types of filters. Other loop filters (either in the coding loop or after the coding loop) may also be used to smooth pixel transitions or otherwise improve the video quality. For example, in some embodiments, in-loop filtering unit 95 includes a bilateral filter as described herein. In one such embodiment, the bilateral filter, if applied, to a block is applied after the deblock filter. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 2.

Figure 5:
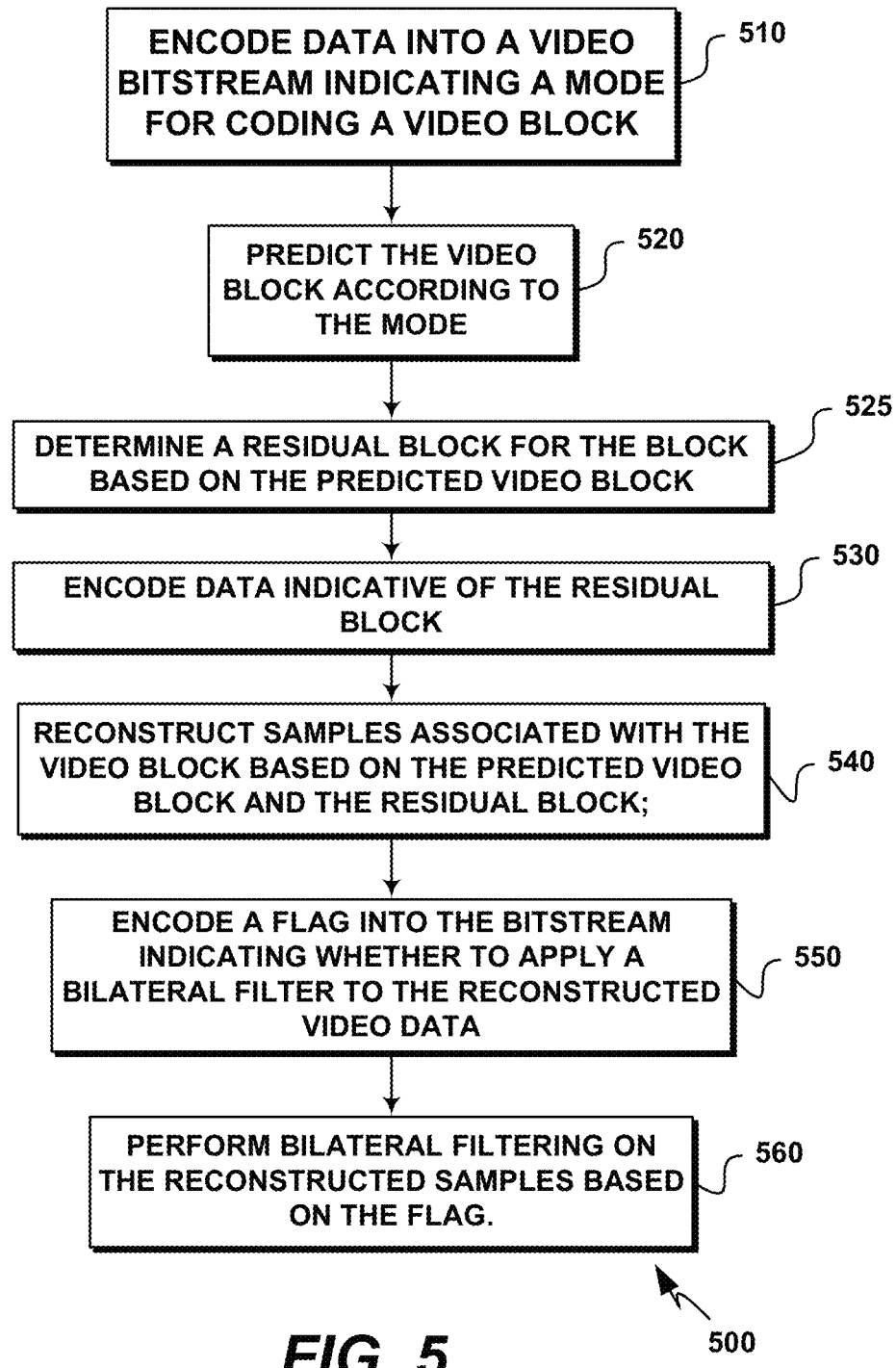
FIG. 5 is a flow chart illustrating one embodiment of a method of encoding video data.

FIG. 5 is a flow chart illustrating one embodiment of a method 500 of encoding video data. In particular, the method 500 illustrates a method of enabling and disabling bilateral filtering based on a flag explicitly signaled in the video bitstream (and not merely indicated by the number of non-zero transform coefficients).

The method 500 as illustrated begins with a block 510 in which video encoder 20 decodes data from a video bitstream indicating a mode for coding a video block. For example, the mode may indicate a prediction method (e.g., inter or intra prediction) and other prediction parameters (such as specific prediction mode). At a block 520, the encoder, e.g., the prediction processing unit 41, predicts the block according the mode to generate a predicted block of the video block. Next at a block 525, the encoder determines a residual based on the predicted block. The residual block is determined to be the difference between the predicted block samples and the actual block samples Moving to a block 530, the video encoder 20 encodes data indicative of the residual block. The data indicative of the residual block may comprise zero or more transform coefficients. In one embodiment, the transform coefficients are generated by the transform processing unit 52, quantized via the quantization unit 54, and entropy coded via the entropy encoding unit 56. At a block 540, the video encoder 20 reconstructs samples associated with the video block based on the predicted video block and the residual block.

At a block 550, the video encoder encodes a flag into the bitstream indicating whether to apply a bilateral filter to the reconstructed video data. It is to be recognized that this flag may be located at any suitable location in the bitstream and may be encoding in the bitstream before or after the mode for the video block and before or after the transform coefficients for the video block. Optionally, the encoder encodes the flag into a syntax structure associated with one or more of a transform unit, prediction unit, or largest coding unit that includes the video block. In particular, as noted above, multiple flags may be encoded at different levels (transform, prediction, coding unit) such that the lower level flags override the higher level flags.

Moving to a block 560, the video encoder 20, e.g., via the in-loop filtering unit 64, performs bilateral filtering on the reconstructed samples based on the value of the flag. In one specific embodiment, the bilateral filtering is performed via the in-loop filtering unit 64 after the reconstructed block is deblock filtered. In one some embodiments, performing bilateral filtering based on the value of the flag includes determining whether to perform bilateral filtering based on the value of the flag.

In some embodiments, determining whether to perform bilateral filtering based on the value of the flag may be further (i.e., in combination with the flag) based on additional flags signaled at different coding levels (e.g., two or more of picture, slice, largest coding unit, coding unit, prediction unit, or transform unit level syntax) such that a flag comprising a lower level syntax element may override a flag comprising a higher level syntax element to enable or disable bilateral filtering unit for the particular block or unit. In some embodiments, determining whether to perform bilateral filtering based on the value of the flag may be further based on at least one of a slice type associated with the video block, a motion precision associated with the video block, transform coefficients indicative of the difference between the video block and the predicted video block, the mode for coding the video block, or a deblock filter parameter associated with the block. In yet other embodiments, determining whether to enable/disable bilateral filtering may determined without signaling of a flag and, instead, inferred based on at least one of a slice type associated with the video block, a motion precision associated with the video block, transform coefficients indicative of the difference between the video block and the predicted video block, the mode for coding the video block, or a deblock filter parameter associated with the block.

Figure 6:
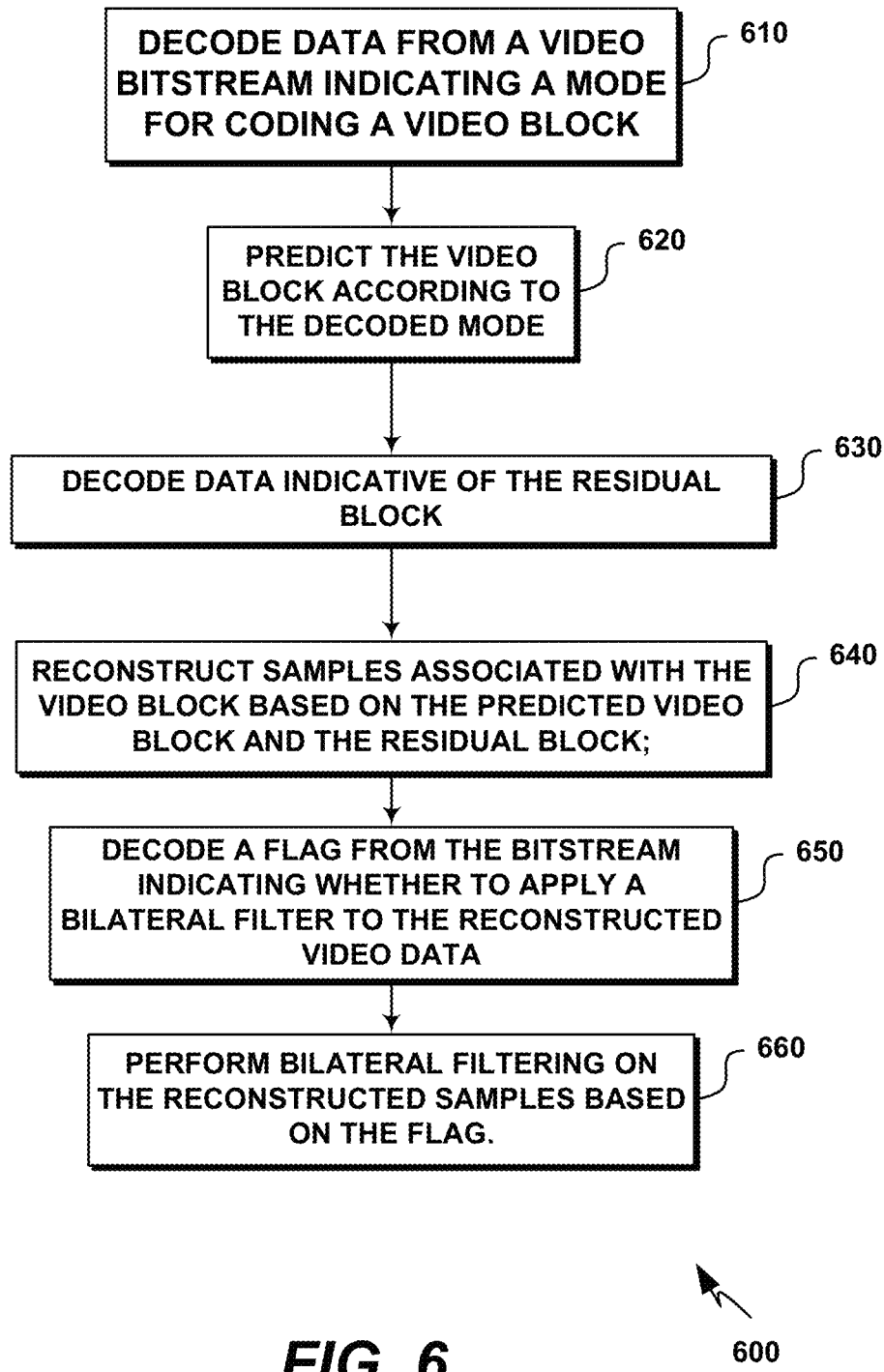
FIG. 6 is a flow chart illustrating one embodiment of a method of decoding video data.

FIG. 6 is a flow chart illustrating one embodiment of a method 600 of decoding video data. In particular, the method 600 illustrates a method of enabling and disabling bilateral filtering at the video decoder 30 based on a flag explicitly signaled in the video bitstream (and not merely indicated by the number of non-zero transform coefficients).

The method 600 as illustrated begins with a block 610 in which video decoder 30 decodes data from a video bitstream indicating a mode for coding a video block. For example, the mode may indicate a prediction method (e.g., inter or intra prediction) and other prediction parameters (such as specific prediction mode). At a block 620, the decoder 30, e.g., the prediction processing unit 81, predicts the block according the mode to generate a predicted block of the video block.

Moving to a block 630, the video decoder 30 decodes data indicative of the residual block from the video bitstream. The data indicative of the residual block may comprise zero or more transform coefficients. In one embodiment, the transform coefficients are used by the inverse transform processing unit 88, after being entropy decoded via the entropy decoding unit 80 and dequantized via the inverse quantization unit 86 to generate a residual block. At a block 640, the video decoder 30 reconstructs samples associated with the video block based on the predicted video block and the residual block.

At a block 650, the video decoder 30 decodes a flag into the bitstream indicating whether to apply a bilateral filter to the reconstructed video data. It is to be recognized that this flag may be located at any suitable location in the bitstream and may be encoding in the bitstream before or after the mode for the video block and before or after the transform coefficients for the video block. Optionally, the decoder 30 decodes the flag into a syntax structure associated with one or more of a transform unit, prediction unit, or largest coding unit that includes the video block. In particular, as noted above, multiple flags may be encoded at different levels (transform, prediction, coding unit) such that the lower level flags override the higher level flags.

Moving to a block 660, the video decoder 30, e.g., via the in-loop filtering unit 92, performs bilateral filtering on the reconstructed samples based on the value of the flag. In one specific embodiment, the bilateral filtering is performed via the in-loop filtering unit 92 after the reconstructed block is deblock filtered.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

What is claimed is:

1. A method of decoding video data, comprising:
    decoding data from a video bitstream indicating a mode for coding a video block;
    predicting the video block according to the mode to generate a predicted video block of the video block;
    decoding, from the video bitstream, data indicative of a difference between the video block and the predicted video block, the data indicative of the difference comprising data indicative of whether the difference is represented by at least one non-zero transform coefficient;
    reconstructing samples associated with the video block based on the predicted video block and the difference;
    decoding a flag from the video bitstream indicating whether to apply bilateral filtering to the reconstructed samples;
    deblock filtering the reconstructed samples of the video block; and
    performing the bilateral filtering as an in-loop filter for reducing artifacts on the reconstructed samples based on the flag and based on whether the difference is represented by the at least one non-zero transform coefficient, wherein the deblock filtering is performed prior to the bilateral filtering, and wherein performing the bilateral filtering on the reconstructed samples comprises generating a filtered sample value, $I_D(i,j)$, using neighboring ones of the reconstructed samples according to $$\frac{\sum_{k,l} I(k,l) * \varpi(i,j,k,l)}{\sum_{k,l} \varpi(i,j,k,l)},$$

wherein $\overline{\omega}(i, j, k, l)$ is a weight assigned for a sample (k, l) to filter a sample (i, j) and is defined as $$\varpi(i,j,k,l) = e^{\left(-\frac{(i-k)^2+(j-l)^2}{2\sigma_d^2} - \frac{\|I(i,j)-I(k,l)\|^2}{2\sigma_r^2}\right)},$$

wherein I(i, j) and I(k, l) are intensive value of samples (i, J) and (k,l) respectively, ad is a spatial parameter, and $\sigma_T$ is a range parameter.

2. The method of claim 1, wherein decoding the flag comprises decoding the flag from a syntax structure associated with at least one of a transform unit that includes the video block, a prediction unit that include the video block, or a largest coding unit that includes the video block.

3. The method of claim 1, wherein the video block is within a coding unit of a picture and wherein performing the bilateral filtering is further based on whether the coding unit is an intra-coded coding unit or an inter-coded coding unit.

4. The method of claim 1, wherein the video block is within a slice of a picture and wherein performing the bilateral filtering is further based on whether the slice is an intra-coded slice or an inter-coded slice.

5. The method of claim 1, wherein performing the bilateral filtering on the reconstructed samples based on the flag and further based on at least one of a coding unit type associated with the video block, a motion precision associated with the video block, or a deblock filter parameter associated with the video block.

6. A method of encoding video data, comprising:
encoding data into a video bitstream indicating a mode for coding a video block;
predicting the video block according to the mode to generate a predicted block of the video block;
encoding, into the video bitstream, data indicative of a difference between the video block and the predicted video block, the data indicative of the difference comprising data indicative of whether the difference is represented by at least one non-zero transform coefficient;
reconstructing samples associated with the video block based on the predicted video block and the difference;
encoding a flag into the video bitstream indicating whether to apply bilateral filtering to the reconstructed samples;
deblock filtering the reconstructed samples of the video block; and
performing the bilateral filtering as an in-loop filter for reducing artifacts on the reconstructed samples based on a value of the flag and based on whether the difference is represented by the at least one non-zero transform coefficient, wherein the deblock filtering is performed prior to the bilateral filtering, and wherein performing the bilateral filtering on the reconstructed samples comprises generating a filtered sample value, $I_D(i,j)$, using neighboring ones of the reconstructed samples according to $$\frac{\sum_{k,l} I(k, l) * \varpi(i, j, k, l)}{\sum_{k,l} \varpi(i, j, k, l)},$$

wherein $\overline{\omega}(i,j, k, l)$ is a weight assigned for a sample (k, l) to filter a sample (i, j) and is defined as $$\varpi(i, j, k, l) = e^{\left(-\frac{(i-k)^2+(j-l)^2}{2\sigma_d^2} - \frac{\|I(i,j)-I(k,l)\|^2}{2\sigma_r^2}\right)},$$

wherein I(i, j) and I(k, l) are intensive value of samples (i, j) and (k,l) respectively, $\sigma_d$ is a spatial parameter, and $\sigma_T$ is a range parameter.

7. The method of claim 6, wherein encoding the flag comprises encoding the flag from a syntax structure associated with at least one of a transform unit that includes the video block, a prediction unit that include the video block, or a largest coding unit that includes the video block.

8. The method of claim 6, wherein the video block is within a coding unit of a picture and wherein performing the bilateral filtering is further based on whether the coding unit is an intra-coded coding unit or an inter-coded coding unit.

9. The method of claim 6 wherein the video block is within a slice of a picture and wherein performing the bilateral filtering is further based on whether the slice is an intra-coded slice or an inter-coded slice.

10. An apparatus for decoding video data, comprising:
a memory configured to store the video data; and
a video processor configured to:
decode data from a video bitstream indicating a mode for coding a video block;
predict the video block according to the mode to generate a predicted block of the video block;
decode, from the video bitstream, data indicative of a difference between the video block and the predicted video block, the data indicative of the difference comprising data indicative of whether the difference is represented by at least one non-zero transform coefficient;
reconstruct samples associated with the video block based on the predicted video block and the difference;
decode a flag from the video bitstream indicating whether to apply bilateral filtering to the reconstructed samples;
deblock filter the reconstructed samples of the video block; and
perform the bilateral filtering as an in-loop filter for reducing artifacts on the reconstructed samples based on the flag and based on whether the difference is represented by the at least one non-zero transform coefficient, wherein the video processor is configured to deblock filter the reconstructed samples of the video block prior to performing the bilateral filtering, and wherein to perform the bilateral filtering on the reconstructed samples, the video processor is configured to generate a filtered sample value, $I_D(i, j)$, using neighboring ones of the reconstructed samples according to $$\frac{\sum_{k,l} I(k, l) * \varpi(i, j, k, l)}{\sum_{k,l} \varpi(i, j, k, l)},$$

wherein $\overline{\omega}(i, j, k, l)$ is a weight assigned for a sample (k, l) to filter a sample (i, j) and is defined as $$\varpi(i, j, k, l) = e^{\left(-\frac{(i-k)^2+(j-l)^2}{2\sigma_d^2} - \frac{\|I(i,j)-I(k,l)\|^2}{2\sigma_r^2}\right)},$$

wherein I(i, j) and I(k, l) are intensive value of samples (i, j) and (k, l) respectively, $\sigma_d$ is a spatial parameter, and $\sigma_T$ is a range parameter.

11. The apparatus of claim 10, wherein to decode the flag, the video processor is configured to decoder the flag from a syntax structure associated with one or more of a transform unit, a prediction unit, or a largest coding unit that includes the video block.

12. An apparatus for encoding video data, comprising:
a memory configured to store the video data; and
a video processor configured to:

encode data into a video bitstream indicating a mode for coding a video block;

predict the video block according to the mode to generate a predicted block of the video block;

encode, into the video bitstream, data indicative of a difference between the video block and the predicted video block, the data indicative of the difference comprising data indicative of whether the difference is represented by at least one non-zero transform coefficient;

reconstruct samples associated with the video block based on the predicted video block and the difference;

encode a flag into the video bitstream indicating whether to apply bilateral filtering to the reconstructed samples;

deblock filter the reconstructed samples of the video block; and perform the bilateral filtering as an in-loop filter for reducing artifacts on the reconstructed samples based on a value of the flag and based on whether the difference is represented by the at least one non-zero transform coefficient, wherein the video processor is configured to deblock filter the reconstructed samples of the video block prior to performing the bilateral filtering, and wherein to perform the bilateral filtering on the reconstructed samples, the video processor is configured to generate a filtered sample value, $I_D(i, j)$, using neighboring ones of the reconstructed samples according to $$\frac{\sum_{k,l} I(k, l) * \varpi(i, j, k, l)}{\sum_{k,l} \varpi(i, j, k, l)},$$

wherein $\overline{\omega}(i, j, k, l)$ is a weight assigned for a sample (k, l) to filter a sample i, j and is defined as $$\varpi(i, j, k, l) = e^{\left(-\frac{(i-k)^2+(j-l)^2}{2\sigma_d^2} - \frac{\|I(i,j)-I(k,l)\|^2}{2\sigma_r^2}\right)},$$

wherein I(i, j) and I(k, l) are intensive value of samples (i, j) and (k, l) respectively, $\sigma_d$ is a spatial parameter, and $\sigma_T$ is a range parameter.

13. The apparatus of claim 12, wherein to encode the flag, the video processor is configured to encode the flag from a syntax structure associated with one or more of a transform unit, a prediction unit, or a largest coding unit that includes the video block.

14. The apparatus of claim 12, wherein the video block is within a coding unit of a picture and wherein the video processor is further configured to perform the bilateral filtering based on whether the coding unit is an intra-coded coding unit or an inter-coded coding unit.

15. A non-transitory computer readable medium having stored thereon instructions that when executed by a video processor cause the video processor to:

decode data from a video bitstream indicating a mode for coding a video block;

predict the video block according to the mode to generate a predicted block of the video block;

decode, from the video bitstream, data indicative of a difference between the video block and the predicted video block, the data indicative of the difference comprising data indicative of whether the difference is represented by at least one non-zero transform coefficient;

reconstruct samples associated with the video block based on the predicted video block and the difference;

decode a flag from the video bitstream indicating whether to apply bilateral filtering to the reconstructed samples;

deblock filter the reconstructed samples of the video block; and perform the bilateral filtering as an in-loop filter for reducing artifacts on the reconstructed samples based on the flag and based on whether the difference is represented by the at least one non-zero transform coefficient, wherein the instructions when executed cause the video processor to deblock filter the reconstructed samples of the video block prior to performing the bilateral filtering, and wherein to perform the bilateral filtering on the reconstructed samples, the instructions cause the video processor to generate a filtered sample value, $I_D(i,j)$, using neighboring ones of the reconstructed samples according to $$\frac{\sum_{k,l} I(k, l) * \varpi(i, j, k, l)}{\sum_{k,l} \varpi(i, j, k, l)},$$

wherein $\overline{\omega}(i,j, k, l)$ is a weight assigned for a sample (k, l) to filter a sample (i, j) and is defined as $$\varpi(i, j, k, l) = e^{\left(-\frac{(i-k)^2+(j-l)^2}{2\sigma_d^2} - \frac{\|I(i,j)-I(k,l)\|^2}{2\sigma_r^2}\right)},$$

wherein I(i, j) and I(k, l) are intensive value of samples (i, j) and (k,l) respectively, $\sigma_d$ is a spatial parameter, and $\sigma_T$ is a range parameter.

16. The apparatus of claim 15, wherein the video block is within a coding unit of a picture and wherein the instructions further cause the video processor to perform the bilateral filtering based on whether the coding unit is an intra-coded coding unit or an inter-coded coding unit.

* * * * *